(12) United States Patent
    Kioski et al.

(10) Patent No.: US 9,904,028 B2
(45) Date of Patent: Feb. 27, 2018

(54) ULTRA-HIGH DENSITY SPLICE SYSTEMS

(71) Applicant: Telect, Inc., Liberty Lake, WA (US)

(72) Inventors: Bryan Joseph Kioski, Spokane, WA (US); David Knaggs, Spokane, WA (US); Steven W. Ellison, Mead, WA (US); Walter Dean Takisaki, Spokane Valley, WA (US)

(73) Assignee: Telect, Inc., Liberty Lake, WA (US)

( * ) Notice: Subject to any disclaimer, the term of this patent is extended or adjusted under 35 U.S.C. 154(b) by 0 days.

(21) Appl. No.: 15/052,297

(22) Filed: Feb. 24, 2016

(65) Prior Publication Data
    US 2017/0242211 A1    Aug. 24, 2017

(51) Int. Cl.
    *G02B 6/36* (2006.01)
    *G02B 6/44* (2006.01)
(52) U.S. Cl.
    CPC ......... *G02B 6/4454* (2013.01); *G02B 6/4452* (2013.01)
(58) Field of Classification Search
    USPC ...................................................... 385/135
    See application file for complete search history.

(56) References Cited

U.S. PATENT DOCUMENTS

| | | | | |
|---|---|---|---|---|
| 7,869,684 B2* | 1/2011 | Kowalczyk | .......... | G02B 6/4452 254/134.3 R |
| 2008/0080829 A1* | 4/2008 | Smith | .................. | G02B 6/4452 385/135 |
| 2015/0370025 A1* | 12/2015 | Wells | .................... | G02B 6/4452 385/135 |

* cited by examiner

*Primary Examiner* — Eric Wong
(74) *Attorney, Agent, or Firm* — Lee & Hayes, PLLC

(57) ABSTRACT

A splice tray is removeably received in a chassis received in an access side of a frame. In some examples, the splice tray can have a capacity to receive at least about 288 fiber terminations. The frame having a first fiber management bay arranged at a middle of a back of the access side of the frame, a fiber passageway is arranged between a back of the chassis and the back of the access side of the frame, and a second fiber management bay is be arranged adjacent to the left side or right side of the frame proximate to the splice tray. A displaceable conduit communicatively coupled to a left side or a right side of the splice tray proximate to the front of the splice tray is protectively housed in the first fiber management bay, the fiber passageway, and the second fiber management bay such that the fiber terminations received by the displaceable conduit have at least a minimum bend radius.

20 Claims, 3 Drawing Sheets

ULTRA-HIGH DENSITY SPLICE SYSTEMS

BACKGROUND

An important consideration in data communication equipment is circuit density. Most central data communication locations have limited space. Therefore, there is a need to reduce the size of data communication equipment, and install as much data communication equipment as possible in a relatively small space at a central data communication location.

For data communication manufacturers, making high density frames can be a challenging process in which engineers develop frames to meet the high density needs of the central data communication locations while protecting communication lines, maintaining bend radii of the communication lines, and managing massive amounts of the communication lines. This is particularly true for optical fiber communication lines, where the engineers create total front access (TFA) frames having a high density of optical fibers. Frames exist having a high density capacity of about 3,000 fiber terminations per frame, but the frames are not TFA, and instead require access to the backs of the frames. For example, in the case where the frame has a high density capacity of about 3,000 fiber terminations per frame, the splices are done at the back of the frame. Thus, a user must first splice cables at the back of the frame, and then traverse around a plurality of frames (e.g., a row of frames) to get to the front of the frame to patch the cables at the front of the frame the user is working on.

Moreover, when higher density capacities of fiber terminations are involved, the frames may be a dedicated splicing only frame or a dedicated patching only frame, resulting in a higher quantity of frames, and consuming more space. Further, when higher density capacities of fiber terminations are involved, footprints of the frames can become uncommon (i.e., not a standard size), resulting in uncommon space consumption in data communication locations. For example, when higher density capacities of fiber terminations are involved, a 23-inch mount (58-centimeter mount) frame may be designed to have a footprint of a width about 30 inches (76 centimeters) and a depth of about 24 inches (61 centimeters), which may be an uncommon footprint size used in central data communication locations and may be difficult to utilize with other existing frames and/or in relatively small spaces at the central data communication locations. Also, when higher density capacities of fiber terminations are involved, managing patch and splice portions of the fiber terminations in the frames can be difficult.

SUMMARY

Data communication apparatus are described which are configured to have a high density of fiber terminations per frame (e.g., 3000 or more), are total front access (TFA), and have a common footprint (e.g., a width of about 30 inches (76 centimeters) and a depth of about 36 inches (91 centimeters). Generally, the data communication apparatus include a total front access frame having fiber termination chassis that provide for splicing and patching the high volume of fiber terminations, while protecting the fibers and maintaining bend radii of the fibers. This summary is provided to introduce simplified concepts of ultra-high density splice systems, which are further described below in the Detailed Description. This summary is not intended to identify essential features of the claimed subject matter, nor is it intended for use in determining the scope of the claimed subject matter.

In some examples, a data communication apparatus can include a frame having an access side and a first fiber management bay arranged substantially at a middle of the back of the access side of the frame and arranged between the top and the bottom of the access side of the frame. The data communication apparatus can include a splice tray removeably received in the access side of the frame. In some examples, the splice tray can have a capacity to receive a plurality of fiber terminations. The data communication apparatus can include a displaceable conduit communicatively coupled to the splice tray substantially at a front of the splice tray. In some examples, the displaceable conduit can have a capacity to contain the plurality of fiber terminations received by the splice tray. The data communication apparatus can include a second fiber management bay arranged adjacent to the left side or right side of the frame proximate to the splice tray, and a first portion of the displaceable conduit can be fixed in the first fiber management bay, and a second portion of the displaceable conduit can be protectively housed in the second fiber management bay such that the plurality of fiber terminations contained in the displaceable conduit have at least a minimum bend radius.

In other examples, a data communication apparatus includes a frame having an access side and a chassis received in the access side of the frame. The chassis has a front opposite a back, and the back of the chassis can be spaced a distance from the back of the access side of the frame to provide a fiber passageway arranged between the back of the chassis and the back of the access side of the frame. The data communication apparatus can include a splice tray having a front opposite a back. The splice tray can be removeably received in the chassis such that the front of the splice tray is arranged proximate to the front of the chassis. The splice tray having capacity to receive a plurality of fiber terminations. The data communication apparatus can include a second fiber management bay arranged adjacent to the left side or right side of the frame proximate to the splice tray and a displaceable conduit communicatively coupled to the splice tray. The displaceable conduit can have capacity to contain the plurality of fiber terminations received by the splice tray. In some examples, a first portion of the displaceable conduit is fixed in the first fiber management bay and housed in the fiber passageway, and a second portion of the displaceable conduit is housed in the second fiber management bay such that the plurality of fiber terminations contained in the displaceable conduit have at least a minimum bend radius.

In another example, a data communication apparatus includes a frame having an access side, a splice tray removeably received in the access side of the frame, and a fiber management bay arranged adjacent to the left side or right side of the frame proximate to the splice tray. In some examples, the splice tray can have a capacity to receive a plurality of fiber terminations, and a displaceable conduit can be communicatively coupled to a left side or a right side of the splice tray proximate to the front of the splice tray. The displaceable conduit can have capacity to contain the plurality of fiber terminations received by the splice tray. In some examples, the displaceable conduit enters the front of the fiber management bay and is protectively housed in the fiber management bay such that the plurality of fiber terminations contained in the displaceable conduit have at least a minimum bend radius.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
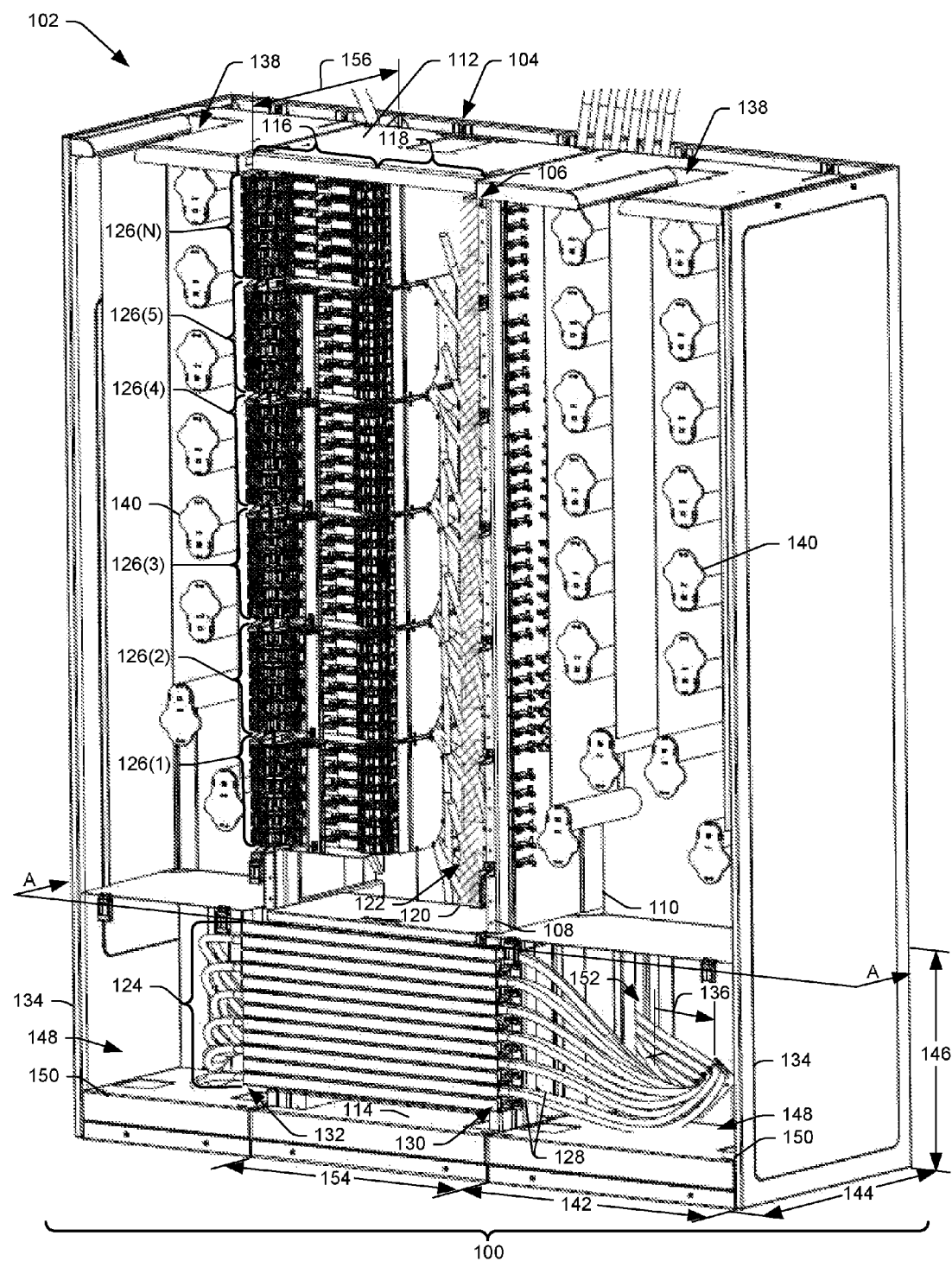
FIG. 1 illustrates a perspective view of an example data communication apparatus.

This disclosure is directed to data communication apparatus having a plurality of splice trays removeably received in a chassis received in an access side of a frame. Each of the plurality of splice trays having a capacity to receive a plurality of fiber terminations (e.g., at least about 288 fiber terminations). Because each of the plurality of splice trays removeably received in the chassis have a capacity to receive a plurality of fiber terminations, a user (e.g., an installer, a technician, a splicer, an information systems technician, etc.) may splice all of the plurality of fiber terminations in one splice tray, in a single operation, rather than splicing a fraction (e.g., ⅙) of the plurality of fiber terminations in a plurality of smaller individual splice trays (e.g., six splice trays having a capacity to collectively receive the plurality of fiber terminations) in a plurality of operations (e.g., six separate operations). In this way, a user may splice all the plurality of fiber terminations in one splice tray in much less time compared to splicing the plurality of smaller fractions of the plurality of fiber terminations collectively received in the plurality of splice trays. For example, because all of the plurality of fiber terminations are received by one splice tray rather than collectively received in a plurality of splice trays, a user can save about 50 minutes. This is because after splicing fiber terminations arranged in a splice tray, the splice tray are maintained stationary (e.g., not displaced) for about 10 minutes while the spliced fiber terminations cool down before installing the splice tray in a frame.

In another example, a splice tray can be removeably received in the chassis received in an access side of a frame such that a front of the splice tray is arranged proximate to a front of the chassis. The frame can have a first fiber management bay arranged substantially at a middle of a back of the access side of the frame, and the chassis can be received in the access side of the frame. A back of the chassis can spaced a distance from the back of the access side of the frame to provide a fiber passageway arranged between the back of the chassis and the back of the access side of the frame, and a second fiber management bay can be arranged adjacent to the left side or right side of the frame proximate to the splice tray. A displaceable conduit can be communicatively coupled to the splice tray having capacity to contain a plurality of fiber terminations received by the splice tray. A first portion of the displaceable conduit can be fixed in the first fiber management bay and housed in the fiber passageway, and a second portion of the displaceable conduit can be housed in the second fiber management bay such that the plurality of fiber terminations contained in the displaceable conduit have at least a minimum bend radius. Because the second portion of the displaceable conduit can be housed in the second fiber management bay such that the plurality of fiber terminations contained in the displaceable conduit have at least a minimum bend radius, a user may remove the splice tray to access and/or service the plurality of fiber terminations received by the splice tray without risk of damaging the plurality of fiber terminations.

In another example, a splice tray can be removeably received in an access side of a frame such that a front of the splice tray is arranged proximate to a front of an access side of the frame, and a fiber management bay can be arranged adjacent to the left side or right side of the frame proximate to the splice tray such that a front of the fiber management bay is arranged proximate to the front of the access side of the frame. The frame can have a first fiber management bay arranged substantially at a middle of a back of the access side of the frame, and the chassis can be received in the access side of the frame. A displaceable conduit can be communicatively coupled to a left side or a right side of the splice tray proximate to the front of the splice tray, and is protectively housed in the fiber management bay such that a plurality of fiber terminations contained in the displaceable conduit have at least a minimum bend radius. Because the displaceable conduit can be protectively housed in the fiber management bay such that the plurality of fiber terminations contained in the displaceable conduit have at least a minimum bend radius, a user may remove the splice tray to access and/or service the plurality of fiber terminations received by the splice tray.

Generally, a splice termination may be two separate fibers (e.g., separate pieces of glass) being joined together through a splice (e.g., joining two fibers end-to-end). And, a patch termination may be separate fibers (e.g., separate cables) terminated in a connector (e.g., Lucent Connectors (LCs), subscriber connectors (SC), etc.)) having an end condition (e.g., an angle-polished connector (APC) end condition or an ultra-polished connector (UPC) end condition). In the patch termination, the separate fibers terminated in the connector may then be inserted into an adapter (e.g., a coupler), where the adapter may provide for an additional cable (e.g., jumper) to be inserted into the opposite end providing a continuous path for light to pass through.

Illustrative Data Communication Apparatuses

FIG. 1 illustrates a perspective view 100 of an example data communication apparatus 102 having a frame 104 having an access side 106. The access side 106 having a front 108 opposite a back 110, a top opposite 112 a bottom 114, and a left side 116 opposite a right side 118. The frame 104 may comprise a first fiber management bay 120 (represented by a lined hatch pattern) arranged substantially at a middle 122 of the back 110 of the access side 106 of the frame 104 and arranged between the top 112 and the bottom 114 of the access side 106 of the frame 104.

FIG. 1 illustrates a plurality of splice trays 124 removeably received in the access side 106 of the frame 104. Each of the plurality of splice trays 124 can have a capacity to receive a plurality of fiber terminations. FIG. 1 further illustrates a plurality of chassis 126(1), 126(2), 126(3), 126(4), 126(5) and 126(N) received in the left side 116 of the access side 106 of the frame 104, and another plurality of chassis 126(1)-126(N) can be received in a right side 118 of the access side 106 of the frame 104 (not shown). Each chassis of the plurality of chassis 126(1)-126(N) can have a capacity to receive the plurality of fiber terminations from a respective splice tray 124. For example, each chassis of the plurality of chassis 126(1)-126(N) can include a plurality of patch trays displaceably received in the chassis that have a capacity to collectively receive the plurality of fiber terminations from a respective splice tray of the plurality of splice trays 124.

FIG. 1 illustrates a plurality of displaceable conduits 128 (e.g., deformable tubes, buffer tubes, furcation tubes, etc.) arranged with the plurality of splice trays 124. For example, each splice tray of the plurality of splice trays 124 can have two displaceable conduits 128 communicatively coupled in a front right side 130 of the splice tray or a front left side 132 of the splice tray. One of the two displaceable conduits 128 having capacity to contain the plurality of fiber terminations received by the splice tray, and a second one of the two displaceable conduits 128 having capacity to contain the plurality of fiber terminations exiting the splice tray and communicatively coupled to at least one chassis of the plurality of chassis 126(1)-126(N). In one example, the plurality of fiber terminations may comprise at least about 288 fiber terminations. In another example, the plurality of fiber terminations may comprise at least about 288 ribbon fiber terminations.

FIG. 1 illustrates second fiber management bays 134 arranged adjacent to the left side 116 and the right side 118 of the frame 104 proximate to the plurality of splice trays 124. The first fiber management bay 120 arranged between the plurality of chassis 126(1)-126(N) arranged on the left side 116 and the plurality of chassis 126(1)-126(N) arranged on the right side 118 can provide for routing the displaceable conduits 128 from the plurality of splice trays 124 to the left and right side plurality of chassis 126(1)-126(N). The first fiber management bay 120 can include one or more restraining members arranged to restrain the plurality of displaceable conduits 128 received by the first fiber management bay 120 from the plurality of splice trays 126(1)-126(N). The second fiber management bays 134 arranged adjacent to the left side 116 and right side 118 of the frame 104 can provide for a first portion of the displaceable conduit 128 to be fixed in the first fiber management bay 120, and at least a second portion of the displaceable conduit 128 to be protectively housed in the second fiber management bay 134 such that the plurality of fiber terminations contained in the displaceable conduit 128 have at least a minimum bend radius 136. In one example, the displaceable conduit 128 can comprise a deformable tube having an outside diameter of about 0.6 inches (1.4 centimeters) and the minimum bend radius can comprise about 7 inches (18 centimeters). In another example, the displaceable conduit 128 can comprise a deformable tube having an outside diameter of about 0.8 inch (2 centimeters) and the minimum bend radius can comprise about 9 inches (23 centimeters).

While FIG. 1 illustrates the plurality of chassis 126(1)-126(N) arranged above the plurality of splice trays 124 displaceably received in the access side 106 of the frame 104, the plurality of chassis 126(1)-126(N) and the plurality of splice trays 124 can be arranged in other locations in the access side 106 of the frame 104. For example, the plurality of splice trays 124 can be displaceably received proximate to a middle and/or the top 112 of the access side 106 of the frame 104 and the plurality of chassis 126(1)-126(N) can be received in the access side 106 of the frame 104 below plurality of splice trays 124.

FIG. 1 illustrates third fiber management bays 138 arranged adjacent to the left side 116 and right side 118 of the frame 104. The third fiber management bays 138 can be arranged in-line with the second fiber management bays 134 and partitioned from the second fiber management bay 134. For example, each of the third fiber management bays 138 may be arranged directly above or below the second fiber management bays 134, and have a wall arranged between the second and third fiber management bays to separate the fiber terminations housed in each of the second and third fiber management bays. The third fiber management bays 138 can include spools 140 for slack management of fiber terminations (e.g., jumpers). In one example, the second fiber management bay 134 comprises a width 142 of about 25 inches (63 centimeters), a depth 144 of about 24 inches (61 centimeters) and a height 146 of at least about 10 rack units (RUs) to at most about 12 RUs. In another example, a second fiber management bay 134 comprises a width 142 of about 17 inches (43 centimeters), a depth 144 of about 24 inches (61 centimeters) and a height 146 of at least about 10 rack units (RUs) to at most about 12 RUs.

FIG. 1 illustrates the second fiber management bay 134 can have an aperture 148 arranged in a front 150 of the second fiber management bay 134 and the frame 104 can have an aperture 152 arranged in the left side 116 or right side 118 of the frame 104. The aperture 148 arranged in the front 150 of the second fiber management bay 134 and the aperture 152 arranged in the left side 116 or right side 118 of the frame 104 can provide for displacing a splice tray of the plurality of splice trays 124 between a storage position removeably received in the frame 104 and an open position arranged outside of the frame 104. For example, the aperture 148 arranged in the front of the second fiber management bay 134 and the aperture 152 arranged in the left side 116 or right side 118 of the frame 104 can have geometries that provide for displacing a splice tray of the plurality of splice trays 124 vertically and/or horizontally relative to the frame 104. The geometry of the aperture 148 arranged in the front of the second fiber management bay 134 may comprise a shape having an open area of about 409 square inches (2640 square centimeters) and the geometry of the aperture 152 arranged in the left side 116 or right side 118 of the frame 104 may comprise a shape having an open area of about 113 square inches (726 square centimeters). Because the aperture 148 arranged in the front of the second fiber management bay 134 and the aperture 152 arranged in the left side 116 or right side 118 of the frame 104 can have geometries that provide for displacing a splice tray of the plurality of splice trays 124 vertically and/or horizontally relative to the frame 104, a user (e.g., an installer, a technician, a splicer, an information systems technician, etc.) may position the splice tray to the open position outside of the frame to splice all of the plurality of fiber terminations in the splice tray (discussed below in detail with regard to FIG. 3).

In one example, the frame 104 may comprise a full frame with a footprint having a width 154 of about 24 inches (61 centimeters) and a depth 156 of about 36 inches (91 centimeters). In another example, the frame 104 may comprise a half frame with a footprint having a width 154 of about 24 inches (61 centimeters) and a depth 156 of about 24 inches (61 centimeters). The frame 104 may meet Zone 4 seismic specifications. For example, the frame may include primary load baring posts that are positioned substantially in a middle of the right and left sides of the frame 104, and secondary load bearing posts. Specifically, in a Zone 4 geographic area, there is a one in ten chance of experiencing a seismic event having an acceleration level of 0.04 times that of gravity in the next fifty years. This compliance is possible via a stress transfer from the secondary load bearing posts to the primary load bearing posts.

FIG. 1 illustrates a section line A-A. The section line A-A is approximate to a top of the plurality splice trays 124 removeably received in the access side 106 of the frame 104.

Figure 2:
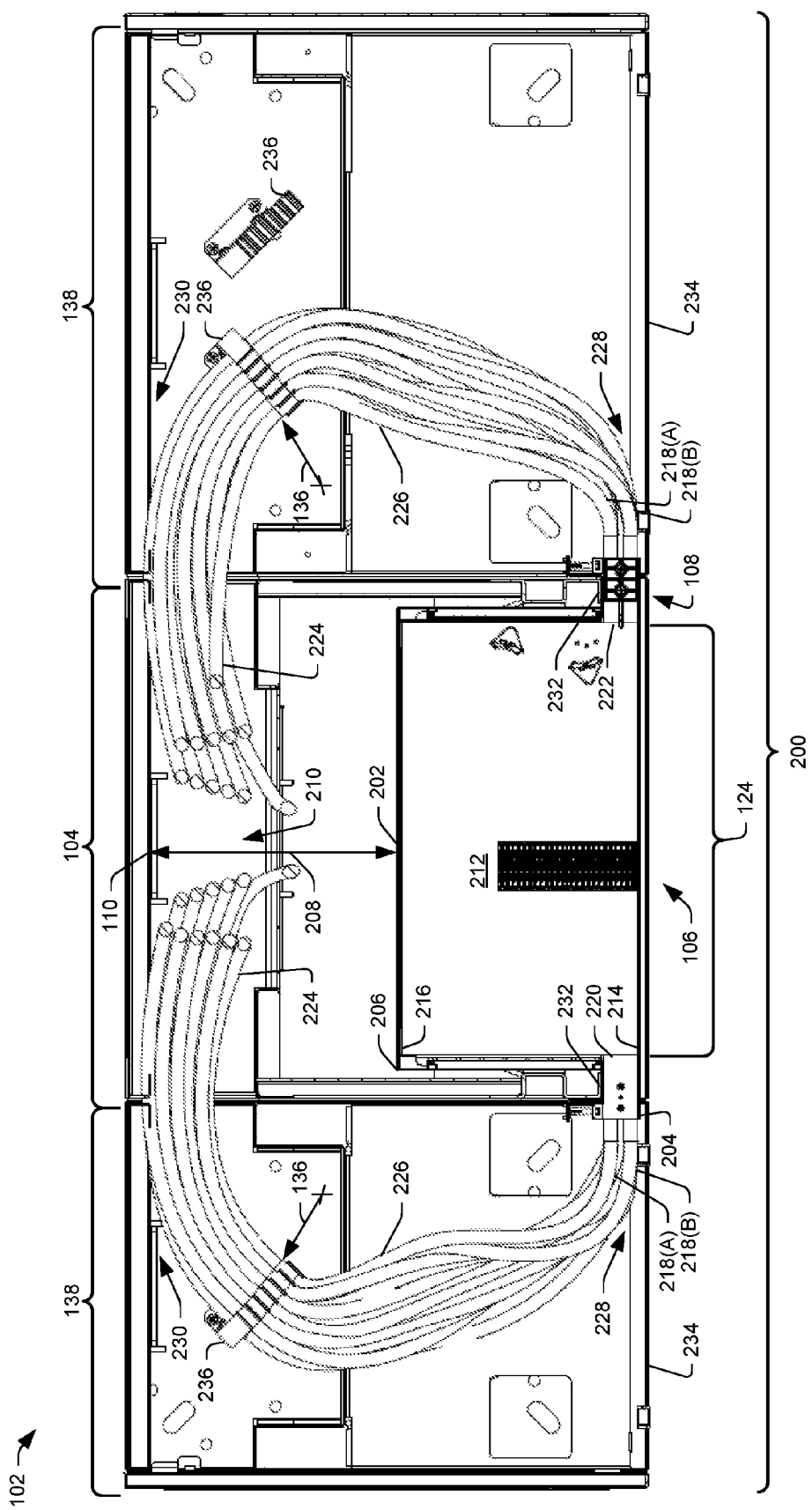
FIG. 2 illustrates a top section view of the example data communication apparatus shown in FIG. 1 taken along section line A-A shown in FIG. 1.

FIG. 2 illustrates a top section view 200 of the example data communication apparatus 102 shown in FIG. 1 taken along section line A-A shown in FIG. 1. Section view 200 illustrates the plurality of splice trays 124 removeably received in a chassis 202 received in the access side 106 of the frame 104. In one example, the chassis 202 may have a capacity to receive at least about 3,456 fiber terminations. The chassis 202 having a front 204 opposite a back 206, the back 206 of the chassis 202 spaced a distance 208 from the back 110 of the access side 106 of the frame 104 to provide a fiber passageway 210 arranged between the back 206 of the chassis 202 and the back 110 of the access side 106 of the frame 104. The distance 208 the back 206 of the chassis 202 is spaced from the back 110 of the access side 106 of the frame 104 may be about 11 inches (29 centimeters).

Section view 200 illustrates a splice tray 212 of the plurality of splice trays 124 having a front 214 opposite a back 216. The splice tray 212 removeably received in the chassis 202 such that the front 214 of the splice tray 212 is arranged proximate to the front 204 of the chassis 202. The splice tray 212 can be displaceable between a storage position removeably received in the chassis 202 and an open position arranged outside of the chassis 202 and have capacity to receive the plurality of fiber terminations.

Section view 200 illustrates displaceable conduits 218(A) and 218(B) communicatively coupled to the splice tray 212. In one example, the displaceable conduits 218(A) and 218 (B) can be communicatively coupled to the splice tray 212 substantially at the front 214 of the splice tray 212. In another example, the displaceable conduits 218(A) and 218(B) can be communicatively coupled to a left side 220 or a right side 222 of the splice tray 212 proximate to the front 214 of the splice tray 212. The displaceable conduit 218(A) having capacity to contain the plurality of fiber terminations received by the splice tray 212 and the displaceable conduit 218(B) having a capacity to contain the plurality of fiber terminations exiting the splice tray 212. For example, the displaceable conduit 218(A) may have capacity to contain the plurality of fiber terminations that are external to the frame 104 and the displaceable conduit 218(B) may have capacity to contain the plurality of fiber terminations that are going to patch connections internal to the frame 104.

Section view 200 also illustrates at least a first portion 224 of the displaceable conduit 218(A) can be housed in the fiber passageway 210, and at least a second portion 226 of the displaceable conduit 218(A) can be housed in the second fiber management bay 134 such that the plurality of fiber terminations contained in the displaceable conduit 218(A) have at least the minimum bend radius 136. Section view illustrates the displaceable conduits 218(A) and 218(B) can enter a front 228 of the second fiber management bay 134 opposite a back 230 of the second fiber management bay and are protectively housed in the second fiber management bay 134. The displaceable conduits 218(A) and 218(B) can enter the front 228 of the second fiber management bay 134 between a post 232 of the frame 104 and a door 234 of the second fiber management bay 134 such that the plurality of fiber terminations contained in the displaceable conduit have at least the minimum bend radius 136. The posts 232 of the frame 104 may be secondary load bearing posts for Zone 4 geographic area seismic compliance. Because the displaceable conduits 218(A) and 218(B) enter the front 228 of the second fiber management bay 134 between the post 232 of the frame 104 and the door 234 of the second fiber management bay 134 the splice tray 212 can be displaced between a storage position removeably received in the chassis 202 and an open position arranged outside of the chassis 202 (described in detail below with regard to FIG. 3). While section view 200 illustrates the second fiber management bay 134 having a door 234 covering the front 228 of the second fiber management bay 134, the second fiber management bay 134 may have a window, a screen, a net, etc. covering the front 228 of the second fiber management bay 134.

A restraining member 236 may be arranged in the second fiber management bay 134 and/or in the fiber passageway 210, the restraining members 236 arranged to restrain the displaceable conduit housed in the fiber passageway such that the plurality of fiber terminations contained in the displaceable conduit maintain the minimum bend radius. For example, a restraining member 236 arranged in the fiber passageway 210 can restrain the first portion 224 of the displaceable conduit 218(A) housed in the fiber passageway 210 such that the plurality of fiber terminations contained in the displaceable conduit 218(A) maintain at least the minimum bend radius 136. The restraining members 236 may comprise brackets having a series of interference fit members, press fit members, friction fit members arranged to restrain each of the displaceable conduits. For example, the members may comprise protrusions, fingers, clips, etc. arranged to restrain each of the displaceable conduits.

The second fiber management bay 134 may receive additional plurality of displaceable conduits. For example, the second fiber management bay 134 may receive a plurality of displaceable conduits from another plurality of splice trays removeably received in a neighboring frame arranged adjacent to the second fiber management bay 134. For example, another plurality of displaceable conduits received from a neighboring frame may enter the front of the second fiber management bay 134 between a post of the neighboring frame and the door 234 of the second fiber management bay 134 and be retained by the restraining member 236 such that the plurality of fiber terminations contained in the other displaceable conduits have at least a minimum bend radius 136.

Figure 3:
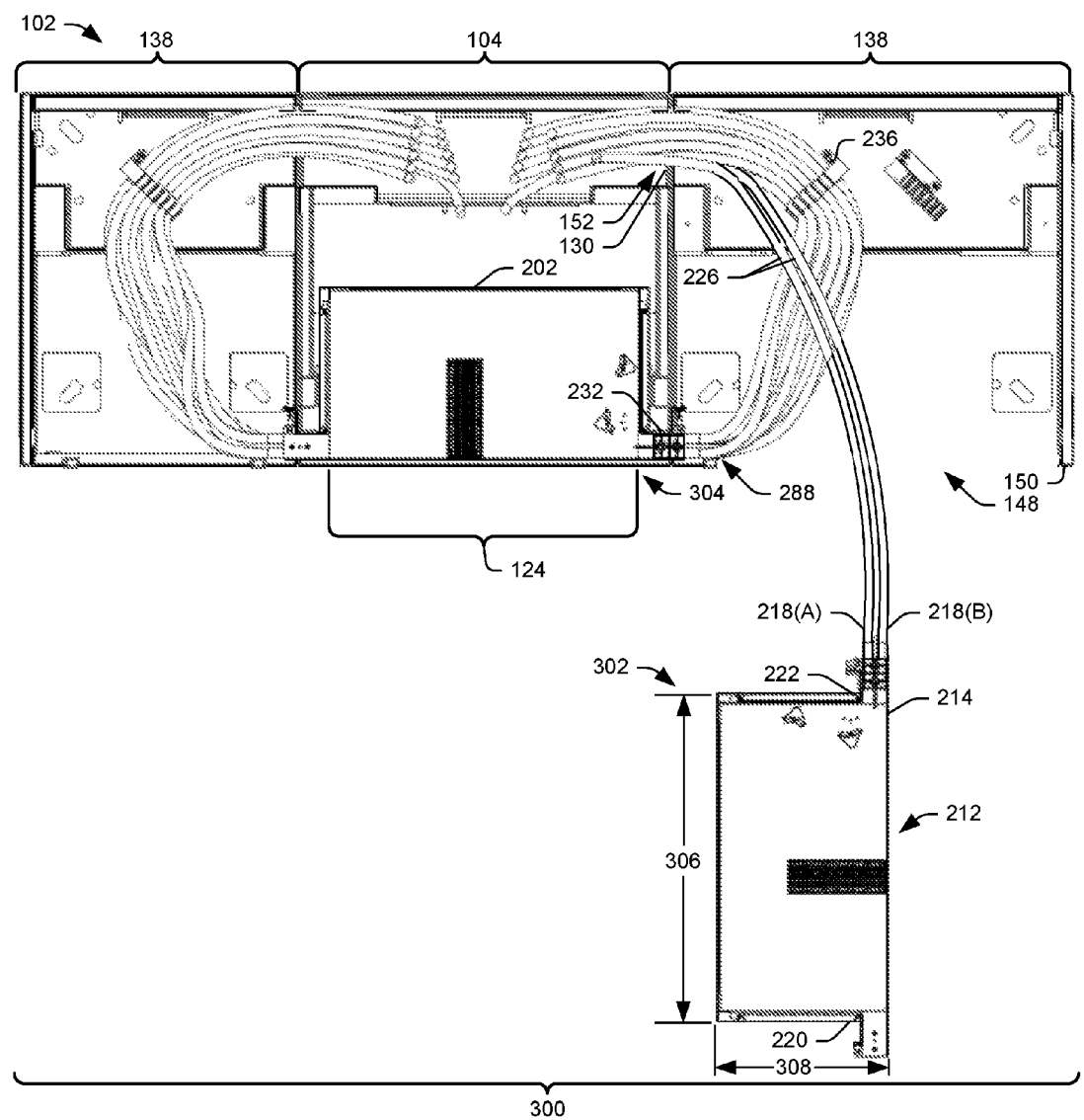
FIG. 3 illustrates a top section view of the example data communication apparatus shown in FIG. 1 taken along section line A-A shown in FIG. 1 with a splice tray in an open position.

FIG. 3 illustrates a top section view 300 of the example data communication apparatus 102 shown in FIG. 1 taken along section line A-A shown in FIG. 1 with the splice tray 212 in an open position 302. FIG. 3 illustrates the door 234 removed and the splice tray 212 displaced from a storage position 304 where the splice tray 212 was removeably received in the chassis 202 to the open position 302 where the splice tray 212 is arranged outside of the chassis 202 so that a user may splice all 288 fiber terminations in the splice tray 212. FIG. 3 also illustrates the displaceable conduits 218(A) and 218(B) displaced along with the splice tray 212 in the open position 302 and away from the post 232. For example, the second portions 226 of the displaceable conduits 218(A) and 218(B) are shown displaced out of the restraining member 236 and arranged above a remaining portion of the plurality of displaceable conduits (e.g., plurality of displaceable conduits 128) and away from the post 232. Because the displaceable conduits 218(A) and 218(B) enter the front 228 of the second fiber management bay 134 in front of the post 232 of the frame 104, the displaceable conduits 218(A) and 218(B) can be displaced between the storage position 304 and the open position 302 along with the splice tray 212.

FIG. 3 illustrates the aperture 148 arranged in the front 150 of the second fiber management bay 134 and the aperture 152 arranged in the right side 118 of the frame 104 can provide for displacing the splice tray 212 of the plurality of splice trays 124 between the storage position 304 and the open position 302. For example, the aperture 148 arranged in the front of the fiber management bay 134 and the aperture 152 arranged in the left side 116 or right side 118 of the frame 104 can have a geometry that provides for displacing the displaceable conduits 218(A) and 218(B) vertically and/or horizontally relative to the frame 104 to position the splice tray 212 in the open position 302 where a user may splice all 288 fiber terminations in the splice tray 212.

FIG. 3 illustrates the splice tray 212 comprises a width 306 of about 21 inches (53 centimeters), a depth 308 of about 11 inches (28 centimeters). FIG. 3 also illustrates the displaceable conduits 218(A) and 218(B) communicatively coupled to the right side 222 of the splice tray 212 proximate to the front 214 of the splice tray 212. Because the displaceable conduits 218(A) and 218(B) are communicatively coupled to the right side 222 of the splice tray 212 proximate to the front 214 of the splice tray 212, the splice tray 212 may be pivotably displaced about the frame 104 into the open position 302. While FIG. 3 illustrates the displaceable conduits 218(A) and 218(B) communicatively coupled to the right side 222 of the splice tray 212, the displaceable conduits 218(A) and 218(B) can be communicatively coupled to the left side 220 of the splice tray 212 proximate to the front 214 of the splice tray 212.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A data communication apparatus comprising:
a frame having a footprint with a width and a depth, the frame including an access side having a front opposite a back, a top opposite a bottom, and a left side opposite a right side;
a first fiber management bay arranged substantially at a middle of the back of the access side of the frame and arranged between the top and the bottom of the access side of the frame;
a splice tray having a front opposite a back, the back of the splice tray spaced a distance from the back of the access side of the frame to provide a fiber passageway arranged between the back of the splice tray and the back of the access side of the frame, the splice tray removeably received in the access side of the frame such that the front of the splice tray is arranged proximate to the front of the access side of the frame, the splice tray having capacity to receive at least about 288 fiber terminations;
a displaceable conduit communicatively coupled to the splice tray substantially at the front of the splice tray, the displaceable conduit having capacity to contain the at least about 288 fiber terminations received by the splice tray; and
a second fiber management bay arranged outside of the footprint of the frame and adjacent to the left side or right side of the frame proximate to the splice tray, the second fiber management bay having a front arranged proximate to the front of the splice tray;
wherein:
at least a first portion of the displaceable conduit is fixed in the first fiber management bay at the back of the access side of the frame and behind the back of the splice tray,
the first portion of the displaceable conduit is housed in the fiber passageway and arranged between the splice tray and the back of the access side of the frame, and
at least a second portion of the displaceable conduit enters the front of the second fiber management bay toward the fiber passageway and the first fiber management bay, and is protectively housed in the second fiber management bay such that the at least about 288 fiber terminations contained in the displaceable conduit have at least a minimum bend radius.

2. The data communication apparatus of claim 1, further comprising a third fiber management bay arranged adjacent to the left side or right side of the frame, the third fiber management bay arranged in-line with the second fiber management bay and partitioned from the second fiber management bay, the third fiber management bay comprising slack management members to receive slack of fiber terminations.

3. The data communication apparatus of claim 1, wherein the at least about 288 fiber terminations comprise ribbon fiber terminations.

4. The data communication apparatus of claim 1, further comprising a chassis received in a left side or right side of the access side of the frame and proximate to the top of the access side of the frame, the chassis including a plurality of patch trays removeably received in the chassis, the plurality of patch trays having a capacity to collectively receive the at least about 288 fiber terminations,
wherein the splice tray is arranged below the chassis and proximate to the bottom of the access side of the frame.

5. The data communication apparatus of claim 1, the width of about 24 inches (61 centimeters) and the depth of about 24 inches (61 centimeters).

6. The data communication apparatus of claim 1, wherein the second fiber management bay comprises a width of about 25 inches (63 centimeters), a depth of about 24 inches (61 centimeters) and a height of at least about 10 rack units (RUs) to at most about 12 RUs.

7. The data communication apparatus of claim 1, wherein the splice tray comprises a width of about 21 inches (53 centimeters).

8. The data communication apparatus of claim 1, wherein the displaceable conduit comprises a first displaceable conduit, and
the data communication apparatus further comprises a second displaceable conduit communicatively coupled to the splice tray substantially at the front of the splice tray and adjacent to the first displaceable conduit, the second displaceable conduit having capacity to contain at least about 288 fiber terminations exiting the splice tray.

9. The data communication apparatus of claim 1, wherein the displaceable conduit comprises a deformable tube having an outside diameter of about 0.6 inches (1.4 centimeters) and the minimum bend radius comprises about 7 inches (18 centimeters).

10. A data communication apparatus comprising:
a frame having a footprint with a width and a depth, the frame including an access side having a front opposite a back, top opposite a bottom, and a left side opposite a right side;
a first fiber management bay arranged substantially at a middle of the back of the access side of the frame and arranged between the top and the bottom of the access side of the frame;
a chassis received in the access side of the frame, the chassis having a front opposite a back, the back of the chassis spaced a distance from the back of the access side of the frame to provide a fiber passageway arranged between the back of the chassis and the back of the access side of the frame;
a splice tray having a front opposite a back, the splice tray removeably received in the chassis such that the front of the splice tray is arranged proximate to the front of the chassis, the splice tray having capacity to receive a plurality of fiber terminations;
a second fiber management bay arranged outside of the footprint of the frame and adjacent to the left side or right side of the frame proximate to the splice tray, the second fiber management bay having a front arranged proximate to the front of the chassis; and
a displaceable conduit communicatively coupled to the splice tray substantially at a front of the splice tray, the displaceable conduit having capacity to contain the plurality of fiber terminations received by the splice tray;
wherein:
at least a first portion of the displaceable conduit is fixed in the first fiber management bay at the back of the access side of the frame and behind the back of the chassis,
the first portion of the displaceable conduit is housed in the fiber passageway and arranged between the back of the chassis and the back of the access side of the frame, and
at least a second portion of the displaceable conduit enters the front of the second fiber management bay toward the fiber passageway and the first fiber management bay, and is housed in the second fiber management bay such that the plurality of fiber terminations contained in the displaceable conduit have at least a minimum bend radius.

11. The data communication apparatus of claim 10, further comprising a restraining member arranged in the fiber passageway, the restraining member arranged to restrain the first portion of the displaceable conduit housed in the fiber passageway such that the plurality of fiber terminations contained in the displaceable conduit maintain at least the minimum bend radius.

12. The data communication apparatus of claim 10, further comprising an aperture arranged in the left side or right side of the frame between the fiber passageway and the second fiber management bay;
wherein the splice tray is displaceable between a storage position removeably received in the chassis and an open position arranged outside of the chassis, and the aperture having a geometry that provides for the displaceable conduit to be displaced along with the splice tray.

13. The data communication apparatus of claim 10, wherein the plurality of fiber terminations comprises at least about 288 fiber terminations.

14. The data communication apparatus of claim 10, wherein the displaceable conduit comprises a deformable tube having an outside diameter of about 0.6 inches (1.4 centimeters) and the minimum bend radius comprises about 7 inches (18 centimeters).

15. The data communication apparatus of claim 10, wherein the chassis received in the access side of the frame comprises a splice chassis arranged proximate to the bottom of the access side of the frame,
and the data communication apparatus further comprises a patch chassis received in the left side or the right side of the access side of the frame above the splice chassis, the patch chassis including a plurality of patch trays removeably received in the patch chassis, the plurality of patch trays having a capacity to collectively receive the plurality of fiber terminations.

16. A data communication apparatus comprising:
a frame having a footprint with a width and a depth, the frame including an access side having a front opposite a back, top opposite a bottom, and a left side opposite a right side;
a splice tray having a front opposite a back, the back of the splice tray spaced a distance from the back of the access side of the frame to provide a fiber passageway arranged between the back of the splice tray and the back of the access side of the frame, the splice tray removeably received in the access side of the frame such that the front of the splice tray is arranged proximate to the front of the access side of the frame, the splice tray having capacity to receive a plurality of fiber terminations;
a first fiber management bay having a front opposite a back, the first fiber management bay arranged outside of the footprint of the frame and adjacent to the left side or right side of the frame proximate to the splice tray such that the front of the first fiber management bay is arranged proximate to the front of the access side of the frame;
a second fiber management bay arranged substantially at a middle of the back of the access side of the frame and arranged between the top and the bottom of the access side of the frame; and
a displaceable conduit communicatively coupled to a left side or a right side of the splice tray proximate to the front of the splice tray, the displaceable conduit having capacity to contain the plurality of fiber terminations received by the splice tray;
wherein:
a first portion of the displaceable conduit enters the front of the first fiber management bay toward the fiber passageway and the second fiber management bay,
a second portion of the displaceable conduit is housed in the fiber passageway and arranged between the splice tray and the back of the access side of the frame,
a third portion of the displaceable conduit is fixed in the first fiber management bay at the back of the access side of the frame and behind the back of the splice tray, and
the plurality fiber terminations contained in the displaceable conduit have at least a minimum bend radius.

17. The data communication apparatus of claim 16, wherein the displaceable conduit comprises a first displaceable conduit, and the data communication apparatus further comprises a second displaceable conduit communicatively coupled to the left side or the right side of the splice tray proximate to the front of the splice tray and adjacent to the first displaceable conduit, the second displaceable conduit having capacity to contain a plurality of fiber terminations exiting the splice tray.

18. The data communication apparatus of claim 17, wherein the first displaceable conduit or the second displaceable conduit comprises a deformable tube having an outside diameter of about 0.6 inches (1.4 centimeters) and the minimum bend radius comprises about 7 inches (18 centimeters).

19. The data communication apparatus of claim 16, further comprising a chassis received in the left side or the right side of the access side of the frame and proximate to the top of the access side of the frame, the chassis including a plurality of patch trays removeably received in the chassis, the plurality of patch trays having a capacity to collectively receive the plurality of fiber terminations, wherein the splice tray is arranged below the chassis and proximate to the bottom of the access side of the frame.

20. The data communication apparatus of claim 16, further comprising an aperture arranged in the front of the first fiber management bay;

wherein the splice tray is displaceable between a storage position removeably received in the access side of the frame and an open position arranged outside of the access side of the frame, and the aperture having a geometry that provides for the displaceable conduit to be displaced along with the splice tray.

* * * * *